(12) United States Patent
Hass et al.

(10) Patent No.: US 7,650,642 B2
(45) Date of Patent: Jan. 19, 2010

(54) PEER-TO-PEER LICENSE TRACKING AND CONTROL

(75) Inventors: Kenneth Hass, Wichita, KS (US); Sridhar Balasubramaniam, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 790 days.

(21) Appl. No.: 11/328,700

(22) Filed: Jan. 10, 2006

(65) Prior Publication Data

US 2007/0162764 A1    Jul. 12, 2007

(51) Int. Cl.
*H04L 9/00* (2006.01)
(52) U.S. Cl. .......................... 726/26; 726/27; 713/168
(58) Field of Classification Search ................ 713/168, 713/170, 190–192; 726/2, 4, 17–20, 9–10, 726/26–27
See application file for complete search history.

(56) References Cited

U.S. PATENT DOCUMENTS

| | | | | | |
|---|---|---|---|---|---|
| 5,357,621 | A | * | 10/1994 | Cox | 711/172 |
| 5,790,015 | A | * | 8/1998 | Iitsuka | 340/426.28 |
| 5,942,985 | A | * | 8/1999 | Chin | 340/5.61 |

* cited by examiner

*Primary Examiner*—Hosuk Song
(74) *Attorney, Agent, or Firm*—Raj Abhyanker LLP

(57) ABSTRACT

Peer-to peer licensing tracking and control is disclosed. In one embodiment, a method may include individually disabling a controller module when a code to activate the controller module is different from a number embedded in the controller module, and automatically disabling the controller module when the number is associated with another controller module communicatively coupled to the controller module. The method may further include a master controller module periodically querying one or more of controller modules communicatively coupled to the master controller module. The querying may identify the number and the feature associated with each of the controller modules to store in a validation module of the master controller module as a database. When the number of the controller module matches with one or more numbers of the controller modules listed in the database, the controller may be deactivated.

31 Claims, 8 Drawing Sheets

US 7,650,642 B2

PEER-TO-PEER LICENSE TRACKING AND CONTROL

FIELD OF TECHNOLOGY

This disclosure relates generally to the technical fields of licensing control, and more particularly, to apparatuses, systems, and/or methods of license tracking, control, and management of a data storage device and/or system.

BACKGROUND

Technology (e.g., software and/or hardware) may be licensed rather than sold. That means purchasers may be restricted in using technology by a number of available licensing schemes. For instance, a concurrent use license may be based on a number of simultaneous users accessing a program. It may deal with software running in a server where users connect via a network. Thus, in a five-user concurrent use license, after five users are logged on to the program, a sixth user is prohibited.

A per-seat license may be another such licensing scheme based on a number of users who have access to the program. For example, a 100-user per-seat license means that up to 100 specifically named users have access to the program. Per-seat licensing may be administered by providing user-level security to a directory containing the program.

Presently most technology licensing schemes such as those discussed earlier may rely on integrity of the users. In many instances, a technology license holder may lose revenues if an organization chooses to install technology licensed for a single unit to several units within the organization. There may be no way for the technology holder to track and control such a copyright violation (e.g., resulting in revenue losses for the technology holder), especially when there may be no way to administer usage of technology being sold or to check the integrity of the users.

SUMMARY

Peer-to-peer licensing tracking and control is disclosed. In one aspect, a method may include individually disabling a controller module (e.g., which may include a setting module (e.g., in a nonvolatile static random access memory) having at least an authentication module to process a code entered by a user and compare the code with a number embedded in the controller module, a feature module to enable a feature tied to the number, and a validation module) when the code to activate the controller module is different from the number, and automatically disabling the controller module when the number is associated with another controller module communicatively coupled to the controller module. The feature module may grant a tiered access to a function of a storage device tied to the controller module when the controller module is enabled.

The method may further include a master controller module periodically querying one or more controller modules communicatively coupled to the master controller module. The querying may identify the number and the feature (e.g., which may be set to expire after a specific period) associated with each of the controller modules to store in the validation module of the master controller module as a database (e.g., which may include an ID, the number, the feature, and a status of each of the plurality of controller modules). When the number of the controller module matches with the number of another controller module listed in the database, the controller module may be deactivated. The master controller module may be elected from the controller modules using a number of polling schemes (e.g., such as selecting a controller module with a lowest serial number as the master controller module) as an alternate controller module may be automatically elected using a similar polling schemes (e.g., such as selecting a controller module with a second lowest serial number as the alternate controller module) to take over a function of the master controller module when the master controller module is disabled.

In another aspect, a system may include a master controller module (e.g., which may disable a controller module added to the system when a number of the controller module is associated with one or more controller modules in the system) to periodically query the controller modules, and an alternate controller module to take over a function of the master controller module when the master controller module is disabled. The master controller module may send out a reminder to update a feature embedded in each of the controller modules when a usage period of the feature exceeds a threshold value. Also, the system may limit a number of concurrent data processing systems used to manage the system.

In yet another aspect, an apparatus may include an authentication module to process a code entered by a user and compare the code with a number embedded in a controller module, a feature module to control (e.g., to process the number to enable a feature tied to the number) the feature tied to the number, and a validation module to restrict a repeated use of the number. The various operations (e.g., methods) described herein may be in a form of a machine-readable medium embodying a set of instructions that, when executed by a machine, cause the machine to perform the method.

Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

Peer-to-peer license tracking and control is disclosed. In the following description, numerous specific details are set forth in order to provide a thorough understanding of various embodiments. It will be evident, however, to one skilled in the art that the various embodiments may be practiced without these specific details. An example embodiment provides methods, apparatuses, and systems to authenticate (e.g., individually compare) a code (e.g., a license code entered by a user) with a number (e.g., a license number embedded in a controller module), and disable the controller module when the code is different from the number.

Another example embodiment provides methods, apparatuses, and systems to validate (e.g., by first comparing with peer controllers connected to the controller module) the number (e.g., that may be identical to the code) with the number of any controller module connected to the controller module. It will be appreciated that the various embodiments discussed herein may/may not be the same embodiment, and may be grouped into various other embodiments not explicitly disclosed herein.

Figure 1:
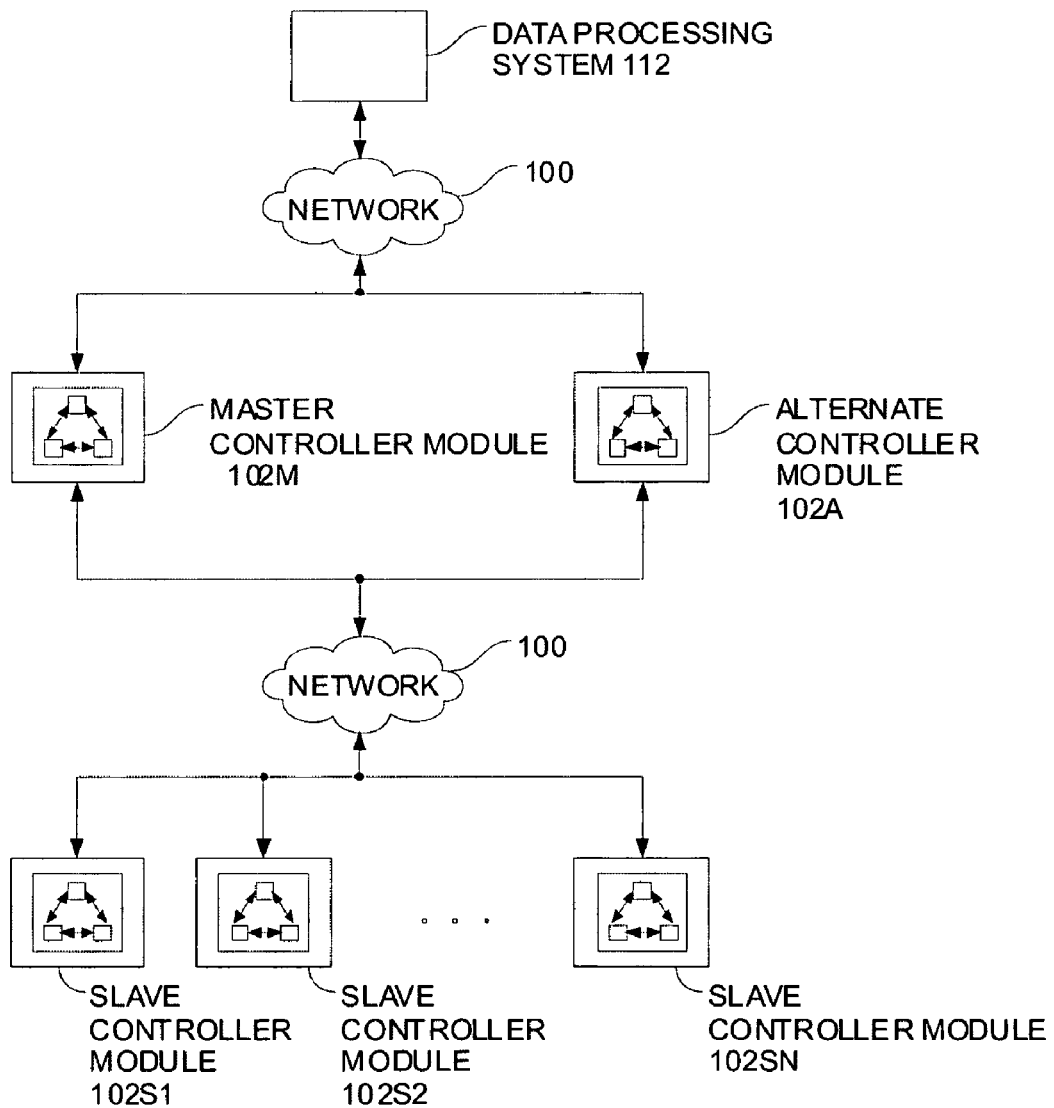
FIG. 1 is a block diagram of a network which connects a master controller module to an alternate controller module, a data processing system, and a slave controller module, according to one embodiment.

FIG. 1 is a block diagram of a network 100 which connects a master controller module 102M to an alternate controller module 102A, a data processing system 112, and a slave controller module 102S, according to one embodiment. In FIG. 1, the network 100 may be an in-band communication mode (e.g., using a fibre channel (FC), SCSI, SAS, SATA, etc.) or an out-of-band communication mode (e.g., using an Ethernet, Internet, etc.). For example, the master controller module 102M and/or the alternate controller module 102A may be connected to the slave controller module 102S through the in-band communication mode, whereas the master controller module 102M and/or the alternate controller module 102A may be connected to the data processing system 112 via the out-of-band communication mode.

In FIG. 1, the master controller module 102M may manage the alternate controller module 102A as well as the slave controller module 102S via the network 100. The master controller module 102M may be elected based on a multiple polling schemes (e.g., through a simple arbitration process such as electing a controller module with a lowest serial number as the master controller module 102M, etc.).

The master controller module 102M may query any number of controller modules connected to the master controller module 102M to identify, update and/or store a database (e.g., a setting table 400 of FIG. 4) which includes an ID 402 (e.g., a controller module ID), a number 404 (e.g., a license number), a feature 406 (e.g., a license feature), and a status 408 (e.g., a controller module status) of each of the any number of controller modules and/or the master controller module 102M. When a new controller module is activated as the slave controller module 102S (e.g., any controller module that does not assume the role of the master controller module 102M or the alternate controller module 102A may be designated as the slave controller module 102S), the master controller module 102M may validate the new controller module by comparing the number 404 of the new controller module with each and every number 404 in the setting table 400. When there is a match, the new controller module may not be activated.

The alternate controller module 102A (e.g., which may be elected through a simple arbitration process such as electing a controller module with a second lowest serial number as the alternate controller module 102A, etc.) may be used to maintain a redundancy in this peer-to-peer license tracking and control apparatus/system/method. In this setting, the alternate controller module 102A may request a copy of the setting table 400 of FIG. 4 from the master controller module 102M on a periodic basis (e.g., every hour, at every midnight, once a week, etc.). When the alternate controller module 102A does not receive the copy from the master controller module 102M, it may assume the role of the master controller module 102M while another controller module may be elected as the alternate controller module 102A.

The master controller module 102M (e.g., formerly alternate controller module 102A) then queries the alternate controller module 102A (e.g., which has just been elected) and the slave controller module 102S for identification (e.g., of its existence). If there is no response, the master controller module 102M (e.g., formerly alternate controller module 102A) will halt a function of the master controller module 102M because it is likely to have been disconnected from the network 100.

If the master controller module 102M (e.g., formerly alternate controller module 102A) does receive the copy from the master controller module 102M (e.g., formerly master controller module 102A), the master controller module 102M (e.g., formerly alternate controller 102A) may compare the copy with the setting table 400 it currently holds. If one or more matches are found, the master controller module 102M (e.g., formerly alternate controller module 102A) will halt the function of the master controller module 102M and store the copy from the master controller module 102M (e.g., formerly the master controller module 102M) as its setting table 400.

If the master controller module 102M (e.g., formerly the master controller module 102M) does not respond to the request, the master controller module 102M (e.g., formerly the alternate controller module 102A) will resume the role of the master controller module 102M and begin querying any number of controller modules connected to it, update the setting table 400, and send a copy of the setting table 400 to the alternate controller module 102A (e.g., which has just been elected).

In the event any controller module stops responding to the query of the master controller module 102M, the any controller module may be flagged as "missing" after n number of failed contact attempts, "removed" after n+x number of failed contact attempts, and then may be removed from the setting table 400 after n+y number of failed contact attempts.

In FIG. 1, a data processing system 112 (e.g., a management workstation, etc.) is connected to the master controller module 102M and the alternate controller module 102A via the network 100 (e.g., an Internet, Ethernet, fibre channel, SCSI, SAS, SATA, etc.). The data processing system 112 may provide a graphic user interface (e.g., such as a host software window (HSW) which may include an enterprise management window (EMW), an array management window (AMW), etc.) which may be used to manage any number of controller modules connected to the data processing system 112. A count of data processing system 112 (e.g., the management workstation, etc.) running concurrently may be limited (e.g., based on a license agreement). For example, only five workstations may be allowed to manage the any number of controller modules.

Figure 2:
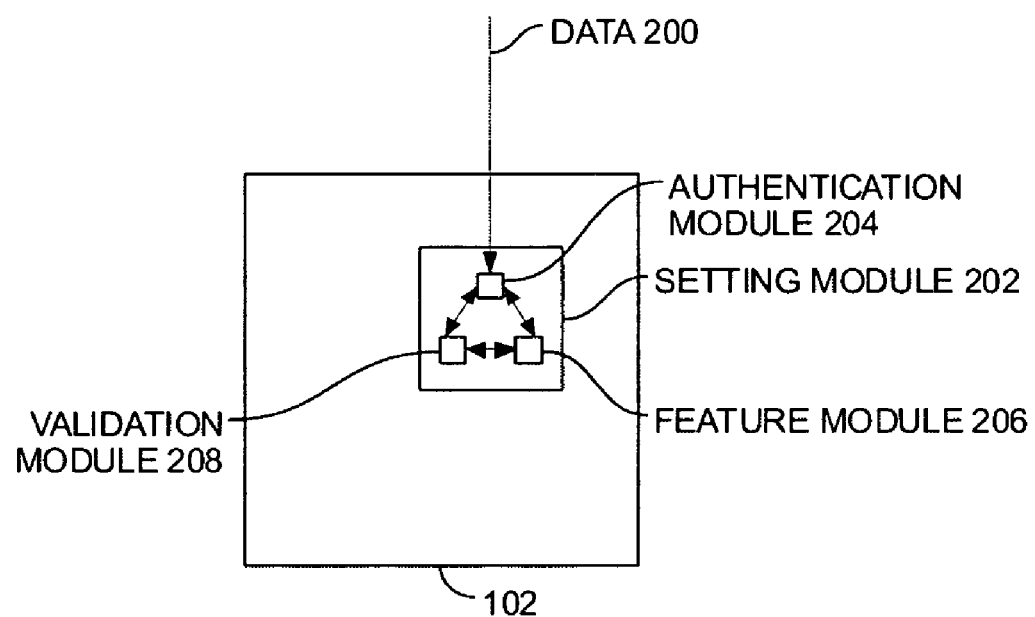
FIG. 2 is a modular diagram of the controller module of FIG. 1 which is connected to the data processing system, according to one embodiment.

FIG. 2 is a modular diagram of the controller module 102 of FIG. 1 which is connected to the data processing system 112, according to one embodiment. In FIG. 2, the controller module 102 includes a setting module 202 which further includes an authentication module 204, a feature module 206, and a validation module 208. The authentication module 202 may process (e.g., using an algorithm that may be applied to a code entered by a user to conform to rules of constructing the number 404 of FIG. 4) and/or compare data 200 (e.g., the code entered by the user) with the number 404 which is embedded in the controller module 102. When there is no match, the controller module 102 may not be activated.

Figure 4:
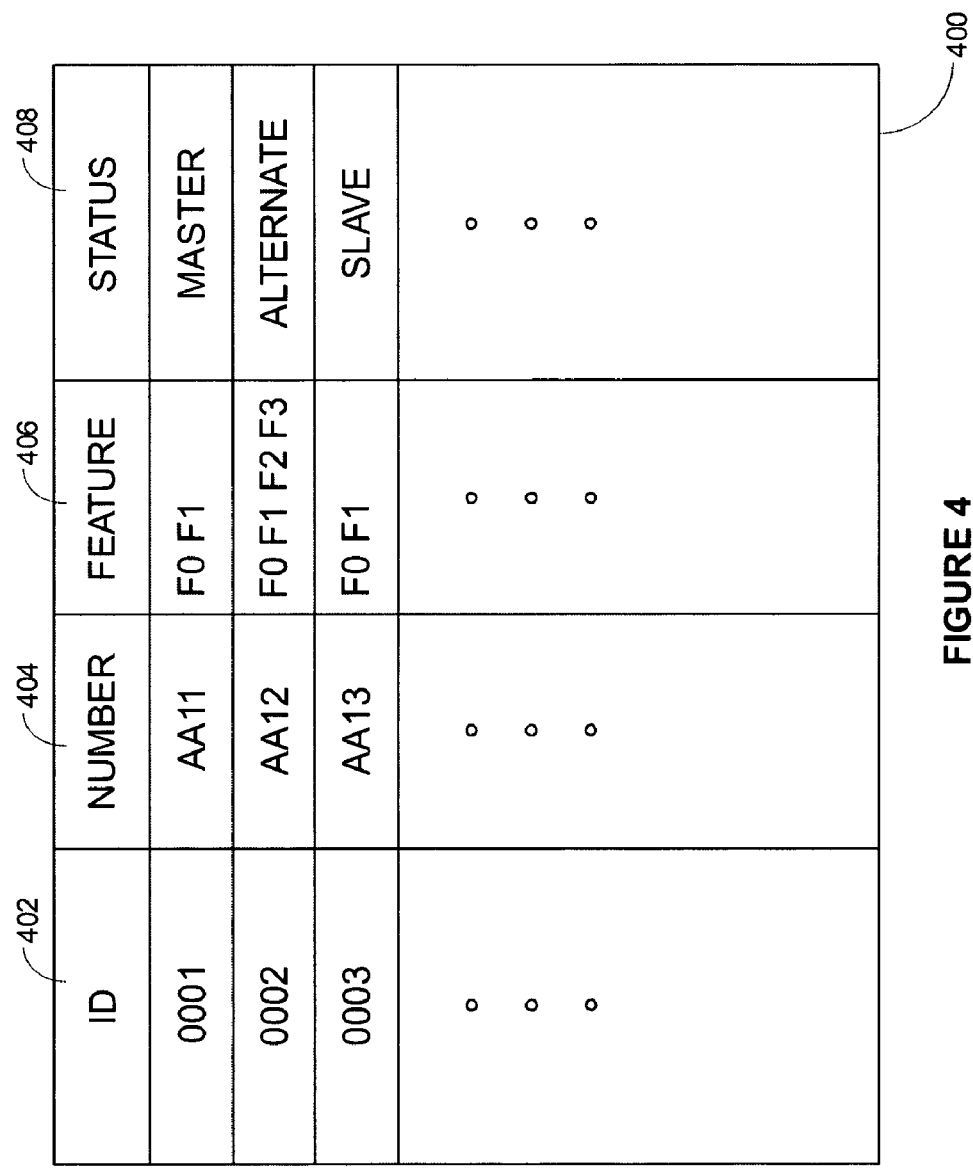
FIG. 4 is a table view of a setting table which may be displayed in the data processing system of FIG. 1, according to one embodiment.

The feature module 206 may provide a tiered access to a function of a storage device tied to the controller module 102. For example, the controller module 102 with the license number AA11 in the setting table 400 of FIG. 4 is granted two tiers of features (e.g., F0 and F1), whereas the controller module 102 with the license number AA12 is granted four tiers of features (e.g., F0, F1, F2, and F3). This would allow the controller module 102 with the license number AA12 more licensing options than the controller module 102 with the license number AA11. The feature 406 may be upgraded when the user legally purchases more options.

Figure 5:
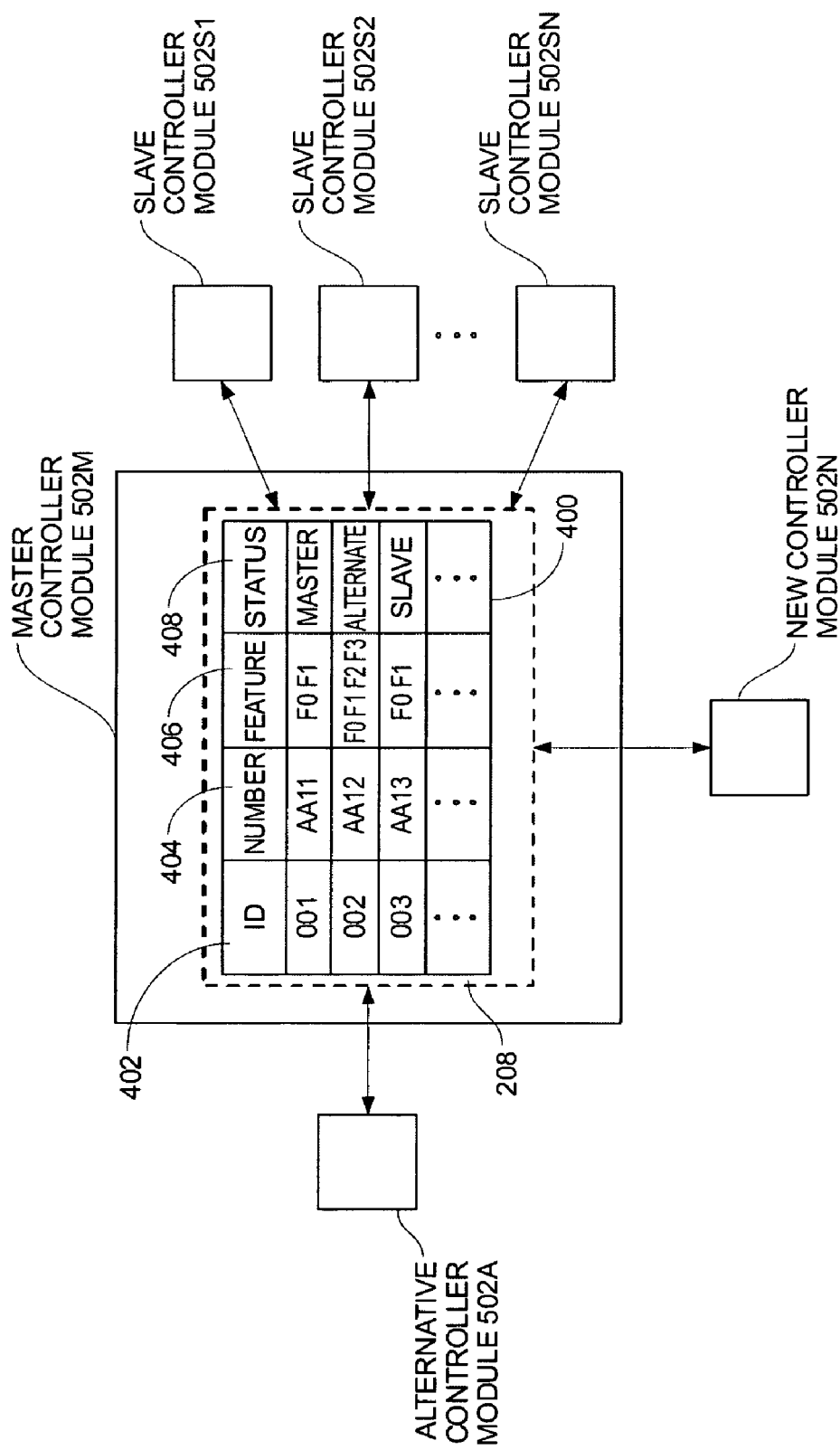
FIG. 5 is a block diagram showing a process of validating a new controller module connected to the master controller module of FIG. 1.

The validation module 208 may be used to restrict a repeated use of the number 404 (e.g., the license number) of FIG. 4 as will be illustrated in FIG. 5. When a user fails to activate the controller module 102, the user may be allowed to implement and/or upload the setting module 202 (e.g., in software and/or hardware) when the user legally obtains (e.g., purchases) the setting module 202. The setting module 202 may be stored in a number of memory spaces (e.g., NVS-RAM, NVRAM, EEPROM, SSD, flash memory, etc.).

In one embodiment, the setting module 202 may be stored in a dedicated storage memory space (e.g., NVSRAM). The setting module 202 may be expired after a specific period (e.g., depending on a type of license purchased by the user), and the master controller module 102M may be programmed to communicate a reminder to assist the user to update (e.g., through notifying when the user's license expires and what additional features are available for update) the setting module 202 of the controller module 102 when a usage period of the setting module 202 exceeds a threshold value (e.g., which may be set during the purchase).

Figure 3:
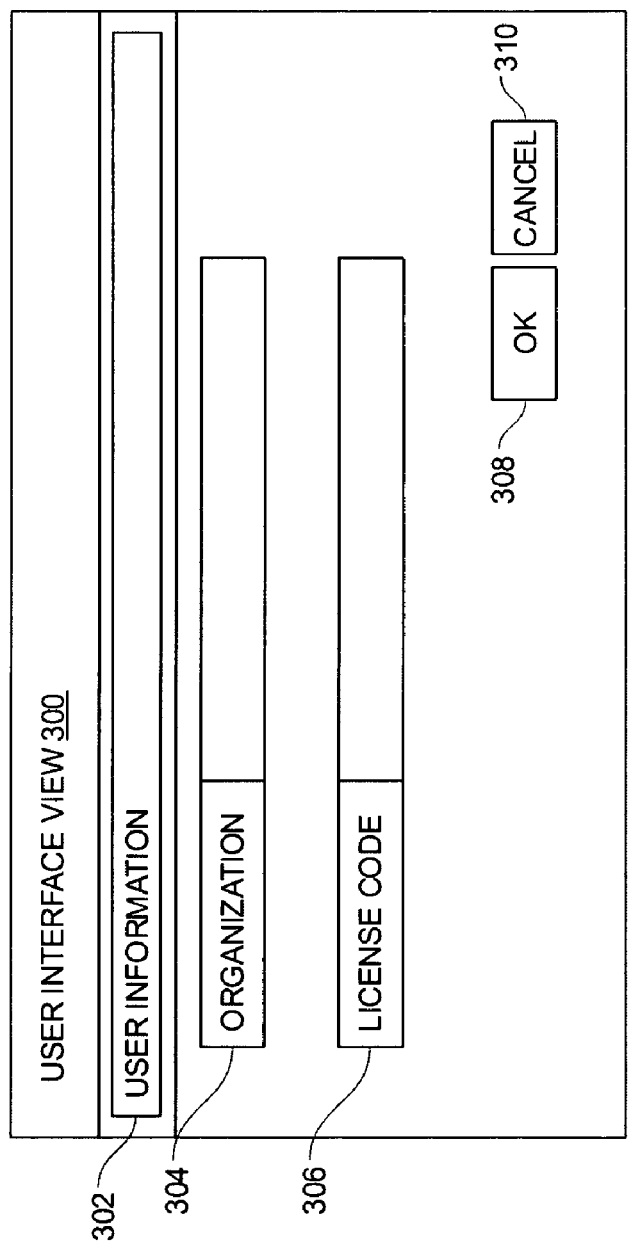
FIG. 3 is a user interface view of the data processing system, according to one embodiment.

FIG. 3 is a user interface view 300 of the data processing system 112, according to one embodiment. The user interface view 300 includes a user information 302, an 'OK' button 308, and a 'CANCEL' button 310. The user information 302 may include an organization 304 (e.g., the organization where the user works) as well as the license code 306 (e.g., the code entered by the user). As the user enters the license code 306, the license code 306 is compared with the number 404 of FIG. 4 embedded in the controller module 102 of FIG. 1. When the license code 306 matches with the number 404, the license code 306 may be authenticated. On the other hand, when the license code 306 does not match the number 404, the user may be notified with an error message.

FIG. 4 is a table view of the setting table 400 which may be displayed on the data processing system 112 of FIG. 1, according to one embodiment. In FIG. 4, the setting table 400 may include the ID 402 (e.g., the controller module ID), the number 404 (e.g., the license number), the feature 406 (e.g., the license feature), and the status 408 (e.g., the controller module status). The ID 402 may be a serial number assigned for the controller module 102. The ID 402 may be used to elect the master controller module 102M or the alternate controller module 102A (e.g., a controller module with a lowest serial number may be elected as the master controller module 102M and a controller module 102 with a second lowest serial number as the alternate controller module 102A, etc.).

The number 404 may be used to identify the setting module 202 when the number 404 is matched with the code (e.g., the license code 306) entered by a user. The feature 406 designates a level of licensing granted to the user as illustrated in FIG. 2. The status 408 displays a designation of the controller module 102. For example, the controller module 102 having the ID 0001 is designated as the master controller module 102M.

FIG. 5 is a block diagram showing a process of validating a new controller module connected to a master controller module 502M. In FIG. 5, the master control module 502M may periodically query the alternate controller module 502A and/or the slave controller module 502S (e.g., to identify, update, and/or store the ID 402 of FIG. 4, the number 404, the feature 406, and the status 408 as in the setting table 400). When a new controller module 502N is connected with the master controller module 502M, the validation module 208 may disable the new controller module 502N when the number 404 of the new controller module 502N is identical to any number 404 listed in the setting table 400.

If the number 404 of the new controller module 502N does not have an identical number in the setting table and the code (e.g., the license code 306) entered by the user matches with the number 404, the master controller module 502M may activate the new controller module 502N and identify and/or store the ID 402, the number 404, the feature 406, and the status 408 of the new controller module 502N in the setting table 400.

Figure 6:
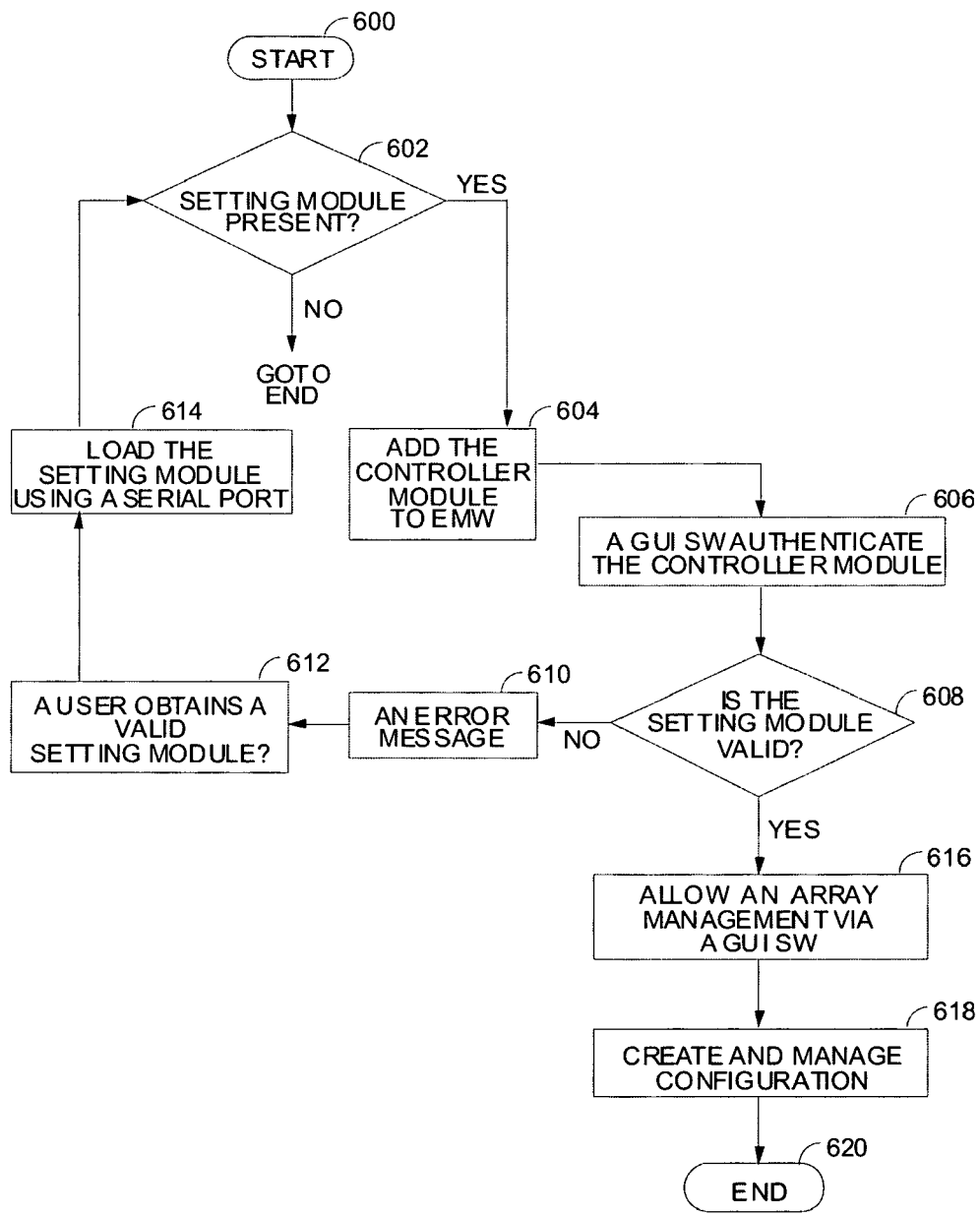
FIG. 6 is a general flow diagram showing a preferred system of peer-to-peer license tracking and control, according to one embodiment.

FIG. 6 is a general flow diagram showing a preferred system of peer-to-peer license tracking and control, according to one embodiment. In operation 602 of FIG. 6, the preferred system automatically checks an availability of the setting module 202 when the controller module 102 is activated. If there is no setting module 202 available in the controller module 102, the controller module 102 may not be added to the Enterprise Management Window (EMW) which may be a place where the user adds a new controller module in order to be managed by the preferred system of peer-to-peer license tracking and control. If there is the setting module 202 present in the controller module 102, the controller module 102 may be added to the EMW in operation 604.

In operation 606, the user may enter the license code 306 of FIG. 3, and the license code 306 is then processed (e.g., using an algorithm to conform to rules of constructing the number 404) and compared with the number 404 of FIG. 4. In operation 608, the setting module 202 is verified through comparing the number 404 of the controller module 102 with each and every controller module 102 present in the preferred system of peer-to-peer license tracking and control (e.g., through utilizing the setting table 400 in the master controller module 102M). If the controller module 102 fails either the authentication step in operation 606 or the verification step in operation 608, an error message is displayed to indicate likewise in operation 610. The verification step in operation 608 may be used to stop an illegal installation of the setting module 202 in more than a single controller module that is legally licensed to the user.

The user may be given an option to obtain an authentic and valid setting module 202 (e.g., through a legal purchase) in operation 612. In operation 614, the legally obtained setting module 202 may be uploaded using a serial port. When the uploading is completed, the user may go through the operations 602 through 608 until the setting module 202 is authenticated and verified.

When the setting module 202 is authenticated and verified, the controller module 102 may be allowed to have an access to the AMW in operation 616, which may be used for sub-level tasks (e.g., volume level activities and drives, etc. related to storage array tasks). Lastly, in operation 618, the user may create and manage a number of configurations afforded by the preferred system of peer-to-peer license tracking and control.

Figure 7:
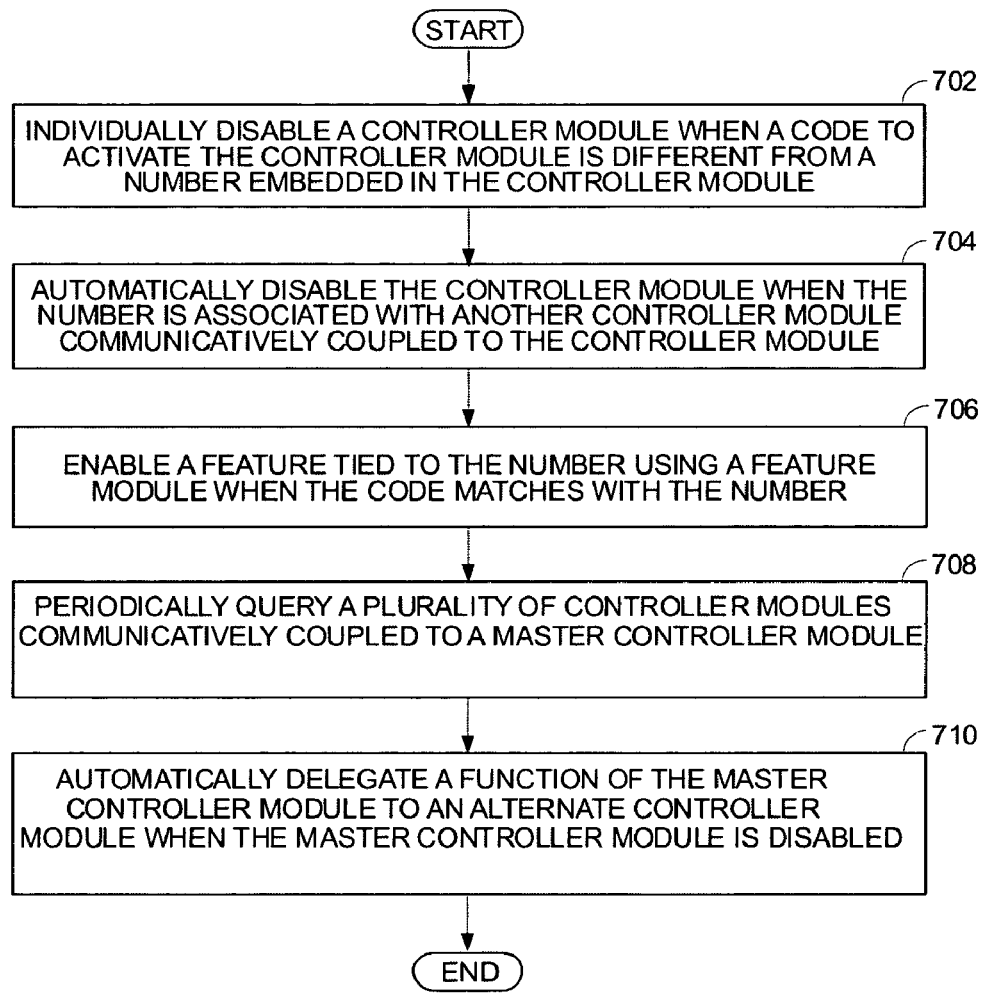
FIG. 7 is a process flow to authenticate and validate the controller module of FIG. 1, according to one embodiment.

FIG. 7 is a process flow to authenticate and validate the controller module 102 of FIG. 1, according to one embodiment. In operation 702, the controller module 102 may be disabled when a code (e.g., the license code 306 of FIG. 3 entered by a user) to activate the controller module 102 of FIG. 1 is different from the number 404 of FIG. 4 embedded in the controller module 102. The controller module 102 may be automatically disabled in operation 704 when the number 404 is associated with (e.g., identical to) the number 404 of another controller module that is active and/or connected to the controller module 102. When the code matches the number 404 of the controller module 102, the feature 406 tied to the number 404 of the controller module 102 may be enabled using the feature module 206 of FIG. 2 in operation 706.

In operation 708, the master controller module 102M may periodically query a plurality of controller modules connected to the master controller module 102M. The alternate controller module 102A may take over a function of the master controller module 102M in operation 710 when the master controller module 102M is disabled.

Figure 8:
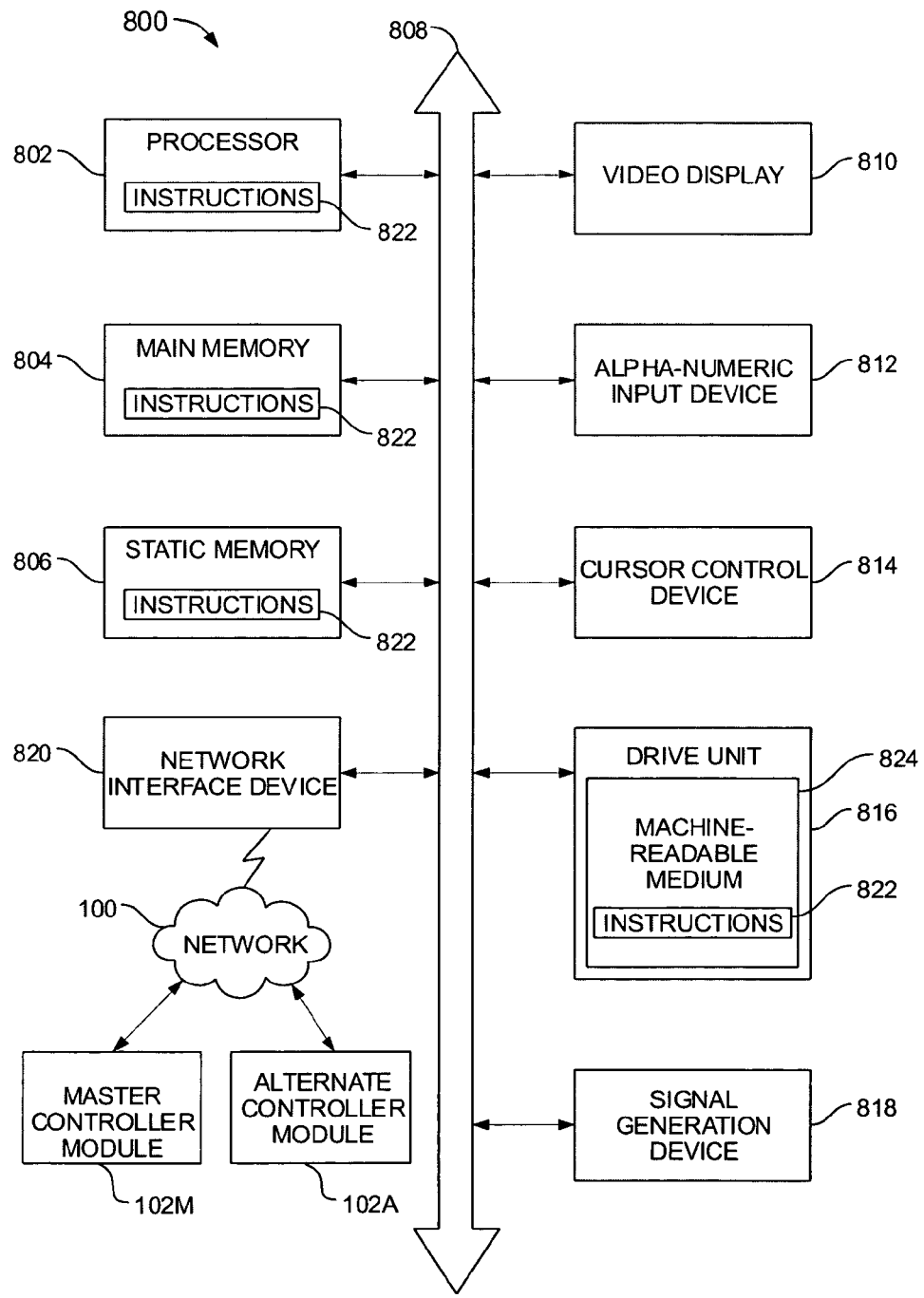
FIG. 8 is a diagrammatic representation of the controller module associated with the data processing system of FIG. 1 capable of processing a set of instructions to perform one or more methodologies described herein, according to on embodiment.

FIG. 8 is a diagrammatic representation of the controller module 102 associated with the data processing system 112 of FIG. 1 capable of processing a set of instructions to perform any one or more of methodologies described herein, according to one embodiment. In various embodiments, the data processing system 112 operates as a standalone device and/or may be connected (e.g., networked through the network 100) to other machines. In a network deployment, the data processing system 112 may operate as a workstation (e.g., to provide a graphic user interface such as the HSW which includes the EMW and the AMW) which connects to the master controller module 102M and the alternate controller module 102A. While only one of the data processing system 112 is displayed in FIG. 1, the data processing system 112 may be any one or any collection of a personal computer (PC), a tablet PC, a set-top box (STB), a personal digital assistant (PDA), a cellular telephone, a web appliance, a network router, a switch and/or a bridge, an embedded system, and/or any machine capable of executing a set of instructions (sequential and/or otherwise) that specify actions to be taken by the machine.

One example of the data processing system 112 may include a processor 802 (e.g., a central processing unit (CPU) or the CPU and a graphics processing unit (GPU)), a main memory 804, and a static memory 806, which communicate to each other via a bus 808. The data processing system 112 may further include a video display unit 810 (e.g., a liquid crystal display (LCD) and/or a cathode ray tube (CRT)), an alphanumeric input device 812 (e.g., a keyboard), a cursor control device 814 (e.g., a mouse), a disk drive unit 816, a signal generation device 818 (e.g., a speaker), and a network interface device 820.

The disk drive unit 816 may include a machine-readable medium 824 on which is stored one or more sets of instructions (e.g., instructions 822) embodying any one or more of the methodologies and/or functions described herein. The instruction 822 may also reside, completely and/or at least partially, within the main memory 804 and/or within the processor 802 during the execution thereof by the data processing system 112, wherein the main memory 804 and the processor 802 may also constitute machine-readable media.

The instruction 822 may further be transmitted and/or received over the network 100 via the network interface device 820. While the machine-readable medium 824 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media, and carrier wave signals.

Although the present embodiments have been described with reference to a specific example embodiment, it will be evident that various modifications and changes may be made to these embodiments without departing from the broader sprit and scope of the invention. For example, the various modules, processors, memories, etc. described herein may be performed and created using hardware circuitry (e.g., CMOS based logic circuitry), firmware, software and/or any combination of hardware, firmware, and/or software (e.g., embodied in a machine readable medium).

For example, the setting module 102 may be embodied using the authentication module 204, the feature module 206, the validation module 208, based on transistors, logic gates, and electrical circuits (e.g., application specific integrated ASIC circuitry) using an authentication circuit, a feature circuit, and a validation circuit. In addition, it will be appreciated that the various operations, process, and methods disclosed herein may be embodied in a machine-readable medium and/or a machine accessible medium compatible with a data processing system (e.g. a computer system). Accordingly, the specification and drawings are to be regarded in an illustrative rather than restrictive sense.

What is claimed is:

1. A method of a controller module, comprising:
individually disabling the controller module through a processor when a code to activate the controller module is different from a number embedded in the controller module;
automatically disabling the controller module when the number is associated with another controller module communicatively coupled to the controller module;
periodically querying a plurality of controller modules through a master controller module that is communicatively coupled to the plurality of controller modules, wherein the querying identifies the number and a feature associated with each of the plurality of controller modules to store in a validation module of the master controller module as a database, wherein the controller module includes a setting module which further includes at least an authentication module, the feature module, and the validation module; and
enabling a feature tied to the number using the feature module when the code matches with the number.

2. The method of claim 1 wherein the authentication module is to process the code and compare the code with the number.

3. The method of claim 1 wherein the enabling the feature is to grant a tiered access to a function of a storage device tied to the controller module.

4. The method of claim 1 wherein the enabling the feature is to grant a tiered access to a function of a storage device tied to the controller module.

5. The method of claim 4 wherein the automatically disabling the controller module is to deactivate the controller module when the number of the controller module matches with at least one number of the plurality of controller modules listed in the database.

6. The method of claim 5 wherein the multiple of polling schemes include selecting the controller module with a lowest serial number as the master controller module and the controller module with a second lowest serial number as the alternate controller module.

7. The method of claim 1 further comprising the master controller module periodically querying the plurality of controller modules communicatively coupled to the master controller module, wherein the querying identifies the number and the feature associated with each of the plurality of controller modules to store in the validation module of the master controller module as the database.

8. The method of claim 1 wherein the database is to include an identification, the number, the feature, and a status of each of the plurality of controller modules.

9. The method of claim 8 further comprising automatically electing an alternate controller module using the multiple of polling schemes to take over the function of the master controller module when the master controller module is disabled.

10. The method of claim 1 wherein the master controller module is elected from the plurality of controller modules using the multiple of polling schemes.

11. A computer readable media embodying a set of instructions that, when executed by a machine having a processor, causes the machine to perform the method of:
individually disabling a controller module through a processor when a code to activate the controller module is different from a number embedded in the controller module;
automatically disabling the controller module when the number is associated with another controller module communicatively coupled to the controller module;
periodically querying a plurality of controller modules through a master controller module that is communicatively coupled to the plurality of controller modules, wherein the querying identifies the number and the feature associated with each of the plurality of controller modules to store in the validation module of the master controller module as a database, wherein the controller module includes a setting module which further includes at least an authentication module, a feature module, and a validation module; and
enabling the feature tied to the number using the feature module when the code matches with the number.

12. A peer-to-peer license tracking system, comprising:
a master controller module to periodically query a plurality of controller module through a processor communicatively coupled to the master controller module; and
an alternate controller module to take over a function of the master controller module when the master controller module is disabled, wherein the master controller module is to send out a reminder to update a feature embedded in each of the plurality of controller modules when a usage period of the feature exceeds a threshold value, wherein the master controller module is to disable the controller module added to the system when the number of the controller module is associated with at least one number of the plurality of controller modules.

13. The peer-to-peer license tracking system of claim 12 wherein the system is to limit a count of concurrent data processing systems used to manage the system.

14. An apparatus, comprising;
an authentication module to process a code entered by a user and compare the code with a number embedded in a controller module;
a feature module to control a feature tied to the number;
a validation module to restrict a repeated use of the number; and
a master controller module that is communicatively coupled to the plurality of controller modules for periodical querying, wherein the querying identifies the number and the feature associated with each of the plurality of controller modules to store in the validation module of the master controller module as a database, wherein the controller module includes a setting module which further includes at least the authentication module, the feature module, and the validation module, wherein the feature module enables the feature tied to the number when the code matches the number.

15. The apparatus of claim 14 wherein to control the feature is to process the number to enable the feature tied to the number.

16. A method of a controller module, comprising:
individually disabling the controller module through a processor when a code to activate the controller module is different from a number embedded in the controller module; and
automatically disabling the controller module when the number is associated with another controller module communicatively coupled to the controller module, wherein a master controller module is to send out a reminder to update a feature embedded in each of the plurality of controller modules when a usage period of the feature exceeds a threshold value, wherein the master controller module is to disable the controller module added to the system when the number of the controller module is associated with at least one number of the plurality of controller modules.

17. The method of claim 16 wherein the controller module includes a setting module which further includes at least an authentication module, a feature module, and a validation module.

18. The method of claim 17 wherein the authentication module is to process the code and compare the code with the number.

19. The method of claim 17 further enabling the feature tied to the number using the feature module when the code matches with the number.

20. The method of claim 19 further comprising the master controller module periodically querying the plurality of controller modules communicatively coupled to the master controller module, wherein the querying identifies the number and the feature associated with each of the plurality of controller modules to store in the validation module of the master controller module as a database.

21. The method of claim 20 wherein the database is to include a identification, a number, a feature, and a status of each of the plurality of controller modules.

22. The method of claim 20 wherein the master controller module is elected from the plurality of controller modules using a multiple of polling schemes.

23. The method of claim 19 wherein the enabling the feature is to grant a tiered access to a function of a storage device tied to the controller module.

24. The method of claim 23 wherein the automatically disabling the controller module is to deactivate the controller module when the number of the controller module matches with at least one number of the plurality of controller modules listed in the database.

25. The method of claim 19 further comprising the master controller module periodically querying the plurality of controller modules communicatively coupled to the master controller module, wherein the querying identifies the number and the feature associated with each of the plurality of controller modules to store in the validation module of the master controller module as the database.

26. The method of claim 17 wherein the authentication module is to process the code and compare the code with the number.

27. The method of claim 17 wherein the multiple of polling schemes include selecting the controller module with a lowest serial number as the master controller module and the controller module with a second lowest serial number as the alternate controller module.

28. The method of claim 16 further comprising automatically electing an alternate controller module using the multiple of polling schemes to take over the function of the master controller module when the master controller module is disabled.

29. A peer-to-peer license tracking system, comprising:
a master controller module to periodically query a plurality of controller module through a processor communicatively coupled to the master controller module; and
an alternate controller module to take over a function of the master controller module when the master controller module is disabled, and
periodically querying a plurality of controller modules through the master controller module that is communicatively coupled to the plurality of controller modules, wherein the querying identifies a number and a feature associated with each of the plurality of controller modules to store in a validation module of the master controller module as a database, wherein the controller module includes a setting module which further includes at least an authentication module, a feature module, and the validation module, wherein the feature module enables the feature tied to the number when a code matches the number.

30. The peer-to-peer license tracking system of claim 29 wherein the master controller module is to disable the controller module added to the system when the number of the controller module is associated with at least one number of the plurality of controller modules.

31. The peer-to-peer license tracking system of claim 29, wherein the master controller module is to send out a reminder to update a feature embedded in each of the plurality of controller modules when a usage period of the feature exceeds a threshold value.

* * * * *

UNITED STATES PATENT AND TRADEMARK OFFICE
CERTIFICATE OF CORRECTION

PATENT NO. : 7,650,642 B2  Page 1 of 1
APPLICATION NO. : 11/328700
DATED : January 19, 2010
INVENTOR(S) : Kenneth Hass and Sridhar Balasubramanian It is certified that error appears in the above-identified patent and that said Letters Patent is hereby corrected as shown below:

Title page item [75]
The last name of the second named inventor reads as "BALASUBRAMANIAM" with an "M" in the patent, and should be corrected to "BALASUBRAMANIAN" with an "N".

Signed and Sealed this

Thirteenth Day of July, 2010

David J. Kappos
*Director of the United States Patent and Trademark Office*